United States Patent [19]

Hale

[11] Patent Number: 4,572,561
[45] Date of Patent: Feb. 25, 1986

[54] TOOL FOR MAGNETICALLY LOCATING AND RECOVERING ELECTRICAL WIRES

[76] Inventor: Thomas G. Hale, P.O. Box 892, Bonita Springs, Fla. 33923-0892

[21] Appl. No.: 669,599

[22] Filed: Nov. 8, 1984

[51] Int. Cl.[4] ............................................. E21C 29/16
[52] U.S. Cl. ............................ 294/65.5; 254/134.3 R
[58] Field of Search ...................... 294/65.5, 19.1, 24, 294/23.5, 23, 22, 21, 20; 254/134.3 R, 134.3 FT; 166/65 M

[56] References Cited

U.S. PATENT DOCUMENTS 3,078,073 2/1963 Zizzo .................................. 294/65.5
3,582,123 6/1971 Kyser ................................. 294/65.5
3,971,543 7/1976 Shanahan ..................... 254/134.3 R Primary Examiner—James B. Marbert
Attorney, Agent, or Firm—Merrill N. Johnson

[57] ABSTRACT

A tool for magnetically locating and recovering an electrical wire suspended within a hollow wall. The tool includes a buoyant magnet suspended in a clear liquid within a transparent container. A rod-like plastic handle is used to manipulate the container along a wall behind which a magnetizable iron member is hanging from the lower end of the electrical wire to be located. A plurality of cylindrical magnets joined end-to-end by flexible linkages are affixed to the opposite end of the plastic handle.

5 Claims, 3 Drawing Figures

U.S. Patent  Feb. 25, 1986  4,572,561
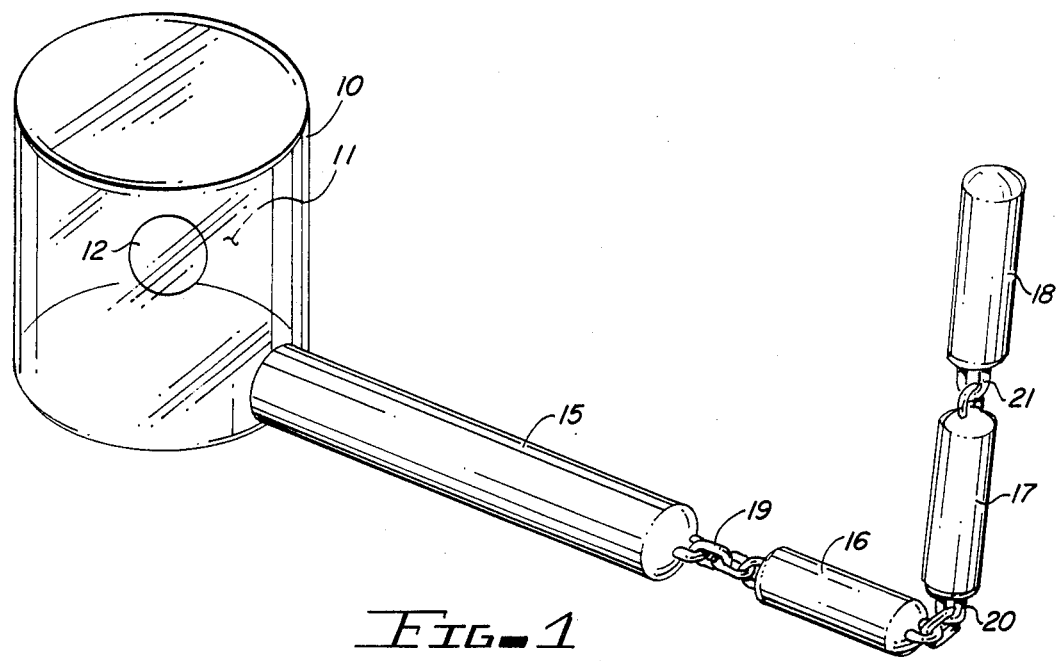
Fig-1
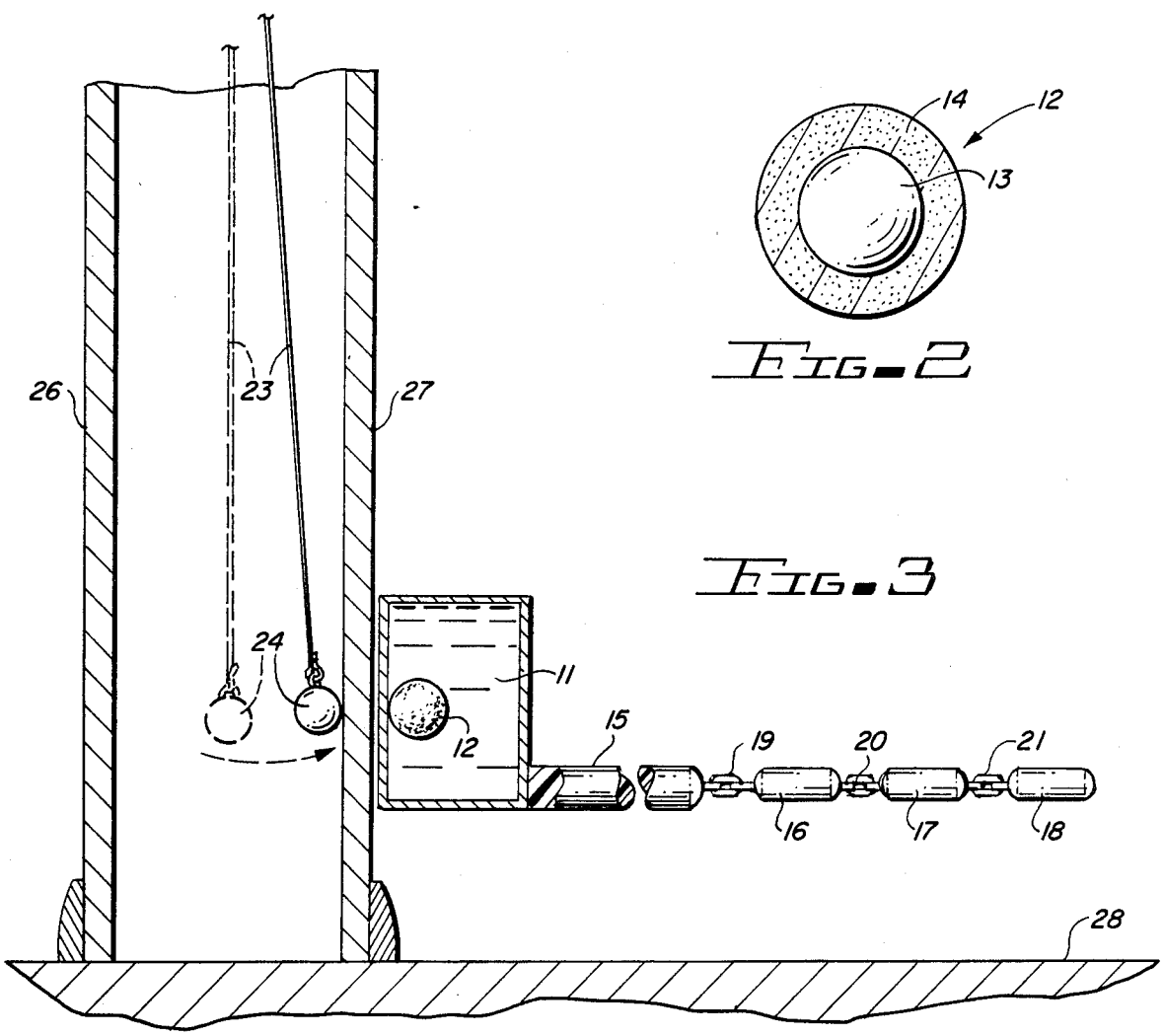
Fig-2
Fig-3

TOOL FOR MAGNETICALLY LOCATING AND RECOVERING ELECTRICAL WIRES

BACKGROUND AND SUMMARY OF THE INVENTION

The present invention relates to a tool for magnetically locating and recovering an electric wire suspended within a hollow wall.

Electricians and the installers of electrical fixtures and telephones in houses and other structures often spend considerable time and effort in locating and retrieving an electrical conduit or wire which is suspended from above within a hollow wall and which is intended to be connected to an electrical outlet or other fixture to be located near the base of the wall.

In the past, the most commonly used method of locating the suspended wire involved cutting a small hole in the lower portion of the wall, inserting a hooked rod through the hole and attempting to snare and retrieve the electric wire through the hole. This method involves considerable guess work and error and is not easy to do even for an experienced electrician.

The use of magnetic force has been suggested to solve the problem of locating and recovering an electric wire hidden within a hollow wall. U.S. Pat. No. 3,078,073 shows a conductor holder which includes a magnet and a separate magnetically attractable sensor. U.S. Pat. No. 3,971,543 teaches a highly magnetizable sensor assembly which includes a chain to be attached to the end of the suspended electrical wire and a rod-shaped contactor at the other end of the chain and a separate housing member with a magnet on one end and a removable cap on its other end.

However, so far as I am aware, neither of the tools shown in U.S. Pat. Nos. 3,078,073 and 3,971,543 or any other tool utilizing magnetic force to locate and retrieve a hidden electrical wire has been available on the market.

I have invented a unique tool which utilizes magnetic force to first locate and then retrieve an electric conduit or wire which is suspended within a hollow wall. To utilize my tool a magnetically attractive weight preferably in the form of an iron ball is attached to the end of the electric wire before it is lowered down into the hollow wall.

My tool includes a powerful magnet preferably in the form of sphere surrounded by a shell or buoyant material such as cork or plastic foam suspended in a clear liquid such as water within a sealed transparent container made of non-conductive material. The weight of the magnet and its surrounding shell is equal to the weight of the liquid which it displaces, thus leaving the magnet free to float or move within the container in response to the magnetic attraction of nearby articles.

A rod-shaped handle of non-conductive material is attached to the container to be grasped in the hand to manipulate the container along the wall behind which the iron weight is hanging from the lower end of the electric wire to be located. As the container is moved directly opposite the suspended weight, the weight will tend to move toward the container and the magnet will float toward the hidden weight. Movement of the floating magnet within the liquid toward the side of the container pressed against the wall will, of course, be noted by the workman manipulating the container and thus he can mark with great accuracy the exact location of the end of the electric wire.

Having marked the location of the end of the electric wire, the tool also provides means to conveniently retrieve the end of the wire. To this purpose, a plurality of cylindrical magnets joined end to end by short lengths of chain are attached to the end of the handle. A small hole is then cut in the wall at the indicated location of the lower end of the wire. The cylindrical magnets attached to the handle are then pushed through the hole and the handle manipulated about until one of the magnets makes contact with the iron weight attached to the end of the electric wire. The magnets are then withdrawn through the hole together with the iron weight which is held against the magnet by magnetic force.

The electric wire is thus recovered for subsequent connection to the desired outlet or fixture.

BRIEF DESCRIPTION OF THE DRAWINGS

FIG. 1 is a perspective view of a preferred embodiment of my unique tool for locating and recovering an electric conduit or wire located within a hollow wall.

FIG. 2 is a side view partially in cross-section of the spherical magnet and its surrounding shell of buoyant material which floats in the liquid sealed inside the transparent container shown in FIG. 1.

FIG. 3 is a side view partially broken away and in cross-section of my tool in use to locate the lower end of an electric wire suspended within a hollow wall.

DETAILED DESCRIPTION OF THE PREFERRED EMBODIMENT

Referring to FIG. 1 of the drawings, the preferred embodiment of my tool includes a clear transparent container 10 which is preferably made of lucite or similar transparent non-conductive plastic material in the form of a sealed cylinder. Container 10 is filled with a clear liquid 11 preferably water. A buoyant sphere 12 is suspended within the clear liquid 11 sealed in container 10.

As best shown in FIG. 2, sphere 12 consists of a powerful preferably spherical magnet 13 surrounded by a shell 14 of buoyant material such as cork or plastic foam. The combined weight of magnet 13 and shell 14 is exactly equal to the weight of an equal volume of the liquid 11 (preferably water) in which the sphere 12 is suspended, thus allowing sphere 12 to float or move freely within container 10 in response to any magnetic forces acting upon magnet 13 as the result of the nearby presence of any magnetically attractive object.

In order to manipulate the container along the surface of a wall, a rod-shaped handle 15 is attached to container 10 as shown in FIGS. 1 and 3. In order to prevent interference with the movement of magnetic sphere 12, handle 15 is made of a non-conductive material such as polyethylene.

To provide a convenient means for retrieving the magnetically located electric wire from within the hollow wall, three small cylindrical magnets 16, 17 and 18 are movably attached to handle 15 and to each other by small lengths of chain 19, 20 and 21 as shown in FIGS. 1 and 3.

In order to most effectively use my tool, a magnetically attractive weight is attached to the end of the electrical conduit or wire before it is dropped down into the hollow wall. Preferably the weight is in the form of an iron or steel ball 24 attached to the lower end of electric wire 23 as shown in FIG. 3. Normally wire 23 weighted by ball 24 hangs straight down between walls 26 and 27 near floor 28 as shown in dotted lines in FIG. 3.

To use my tool to locate and recover the hidden wire 23, a workman grasps the tool by handle 15 and moves the container 10 slowly along the outside of wall 27. As the container approaches ball 24, a magnetic field will be set up between magnet 13 and ball 24 causing each to move toward the other. Ball 24 and the lower end of wire 23 will move toward wall 27 as indicated by the arrow in FIG. 3 and sphere 12 will move within container 12 to the side of the container pressed against wall 27 also as shown in FIG. 3.

Thus the workman will observe the movement of sphere 12 and be able to locate and mark the exact location of ball 24 and the end of electric wire 23.

The workman then can cut a small hole at the place marked on wall 27 large enough to insert magnets 16, 17 and 18 through the hole. By manipulation of handle 15, one or more magnets 16, 17 and 18 will make contact with ball 24 and hold onto the ball as the magnets are withdrawn through the hole in the wall along with magnetically attached ball 24 and the end of electric wire 23.

Thus by use of my tool, a hidden electric wire can be quickly and accurately located and recovered for connection to an electrical outlet or other fixture near the base of the wall. Many hours of time will be saved by use of my tool, as well as the patching of erroneously cut holes.

While I have shown and described a preferred embodiment of my invention, modifications and changes in design and the dimensions of its various components will be apparent to those who become familiar with my tool. The drawings and description of the preferred embodiment are not intended to limit the extent of my invention, whose spirit and scope are limited only by the following claims.

I claim:

1. A tool for locating and retrieving a magnetically attractive weight on the end of an electric wire suspended within a hollow wall comprising
    a sealed transparent container of non-conductive material;
    a clear liquid filling said transparent container;
    a magnet immersed in said clear liquid, said magnet being encased within a shell of buoyant material, the weight of said magnet and its buoyant shell being equal to the weight of an equal volume of the clear liquid;
    a rod-like handle of non-conductive material having one end attached to the transparent container; and
    a plurality of swivelably connected cylindrical magnets attached to the opposite end of said rod-like handle.

2. A tool as set forth in claim 1 in which the sealed transparent container is in the form of a hollow cylinder closed at both ends.

3. A tool as set forth in claim 1 or 2 in which both the magnet and its shell are in the form of a sphere.

4. A tool as set forth in claim 1 or 2 in which three cylindrical magnets are connected end to end and to the handle by short lengths of chain.

5. A tool for locating a magnetically attractive weight on the end of an electric wire suspended behind a wall comprising
    a sealed container made of transparent non-conductive plastic material,
    a clear liquid completely filling the interior of said container,
    a spherical magnet immersed in said clear liquid; and
    a buoyant shell encasing said magnet, the weight of said magnet and its buoyant shell being equal to the weight of an equal volume of said clear liquid.

* * * * *